United States Patent
Larson et al.

Patent Number: 5,413,073
Date of Patent: May 9, 1995

[54] ULTRA LIGHT ENGINE VALVE

[75] Inventors: Jay M. Larson, Marshall; David L. Bonesteel, Richland, both of Mich.

[73] Assignee: Eaton Corporation, Cleveland, Ohio

[21] Appl. No.: 41,749

[22] Filed: Apr. 1, 1993

[51] Int. Cl.⁶ .............................. F01L 3/14; F01L 3/20
[52] U.S. Cl. .................................. 123/188.3; 123/188.9
[58] Field of Search ............... 123/188.1, 188.2, 188.3, 123/188.9

[56] References Cited

U.S. PATENT DOCUMENTS

| | | | |
|---|---|---|---|
| Re. 20,014 | 6/1936 | Scrimgeour | 29/156.7 |
| 2,070,102 | 2/1937 | Weslake | 123/188.3 |
| 2,089,749 | 8/1937 | Jardine | 123/188.3 |
| 2,328,512 | 8/1943 | Thoren et al. | 123/188 |
| 2,354,947 | 8/1944 | Colwell | 123/188.3 |
| 2,394,177 | 2/1946 | Hoern | 123/188.3 |
| 2,411,734 | 11/1946 | Kerwin et al. | 123/188 |
| 2,439,240 | 4/1948 | Cummings | 123/188 |
| 2,731,708 | 1/1956 | Kubera | 29/156.7 |
| 3,378,904 | 4/1968 | Prasse et al. | 29/156.7 |
| 3,710,773 | 1/1973 | Piech et al. | 123/188 |
| 4,459,949 | 7/1984 | Weintz | 123/188.2 |
| 4,597,367 | 7/1986 | Hayashi | 123/188.3 |
| 4,834,036 | 5/1989 | Nishiyama et al. | 123/188 |
| 5,054,195 | 10/1991 | Keck et al. | 29/888.453 |
| 5,056,219 | 10/1991 | Iwase | 123/188.3 |

FOREIGN PATENT DOCUMENTS

| | | |
|---|---|---|
| 2072186 | 9/1971 | France . |
| 0091097 | 10/1983 | Japan . |
| 109206 | 5/1988 | Japan . |
| 0683057 | 11/1952 | United Kingdom . |

*Primary Examiner*—Henry C. Yuen
*Assistant Examiner*—Eric Solis
*Attorney, Agent, or Firm*—Frank M. Sajovec

[57] ABSTRACT

An ultra light poppet valve for an internal combustion engine. The valve is formed by cold forming a blank into an elongated cup having an extremely thin wall and a flared open end onto which a cap is welded, the bottom end of the cup which defines the tip end of the valve having a wall section which is substantially of the thickness of the original blank. In accordance with one aspect of the invention, a keeper groove is formed adjacent the tip end as part of the cold forming process.

18 Claims, 5 Drawing Sheets

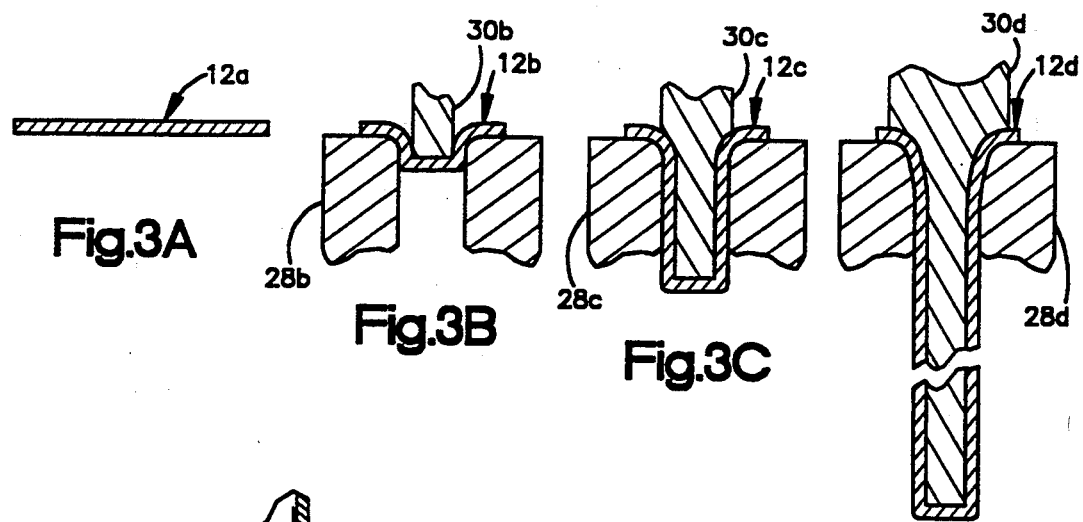
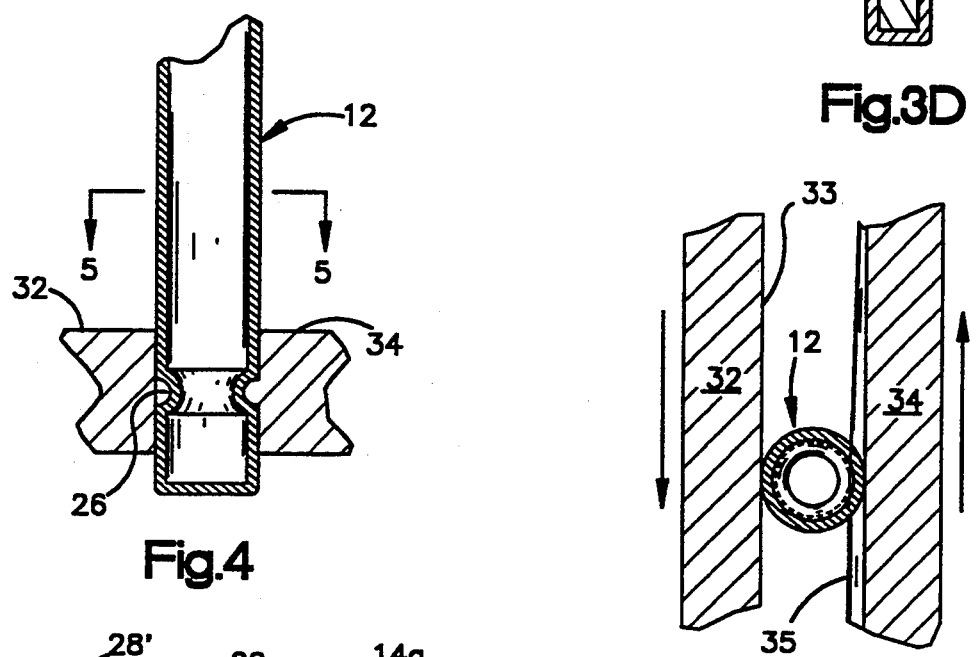
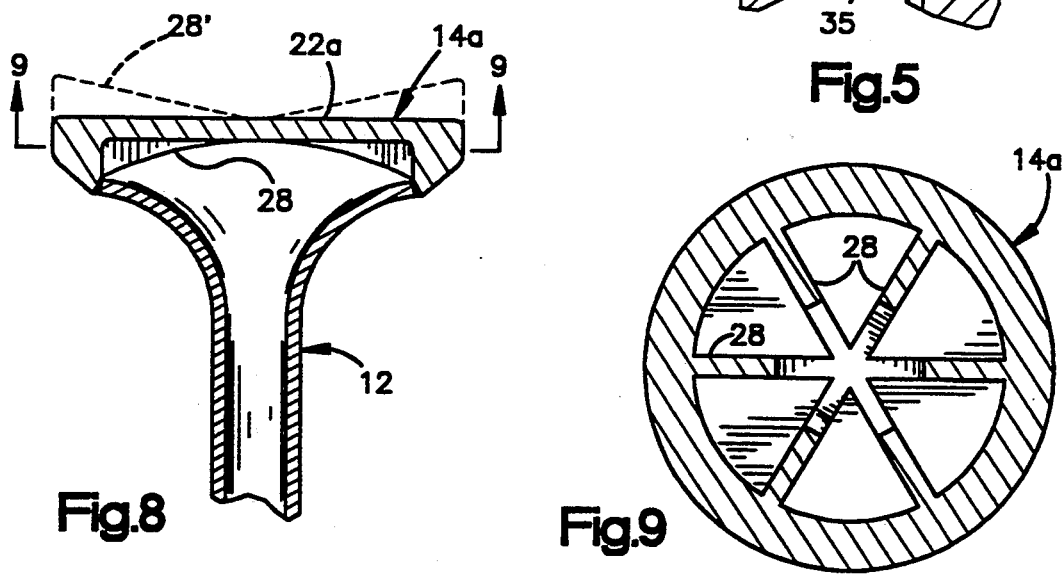

ULTRA LIGHT ENGINE VALVE

The present invention relates generally to popper valves for internal combustion engines, and more particularly to a valve which is of exceptionally light weight while maintaining high strength-to-weight characteristics.

Internal combustion engine poppet valves are most commonly fabricated by machining, forging or extruding a solid blank of high-strength, heat resistant metal and then subjecting the blank to finish machining and/or grinding operations. In some applications, performance requirements make it necessary to provide a valve having a hollow stem into which a coolant such as sodium may be added during the fabrication process. In the prior art, such hollow stems have been formed by means such as drilling the stem or by extruding or forging the stem over a mandrel or a removable core. U.S. Pat. No. 5,054,195 discloses a poppet valve which is fabricated by cold forming a tubular blank to a desired stem diameter, shaping the transition region between the stem diameter and the blank diameter into an arc to define the fillet portion of the valve by means of a kneading process or the like, cutting off the blank at or near the outer diameter of the fillet portion, attaching a cap which defines the head of the valve, and then adding an additional part to close the cavity at the tip end of the valve.

While hollow valves produced by the known fabrication process are significantly lighter than prior art solid valves, increasingly stringent standards of performance, fuel economy and emission control require further weight reduction which is not considered to be economically attainable by the prior art processes. Furthermore, current development work in careless valve actuation, wherein the valve is opened and closed directly by an electrical or fluid actuator, impose valve mass limitations to avoid the excessive actuation energy which would be required by the mass of conventional valves.

To meet the objective of minimum weight, the present invention provides a valve which comprises a stem element which includes an integral tip and fillet portion of the valve, and a cap which is preferably welded to the stem element. In the preferred embodiment, the valve seat face is formed on the cap element, while in alternative embodiments the seat face is formed as part of the weld joint between the fillet and stem element or on the stem element. In accordance with the invention, the stem element is in the form of a cup having a flared open end defining the fillet region of the valve and a closed end defining the tip, and is hollow all the way to the tip. In accordance with the invention, the wall section of the stem element is relatively thick in the fillet region, tapers down to a substantially uniform thickness for the rest of the length of the stem, and is again relatively thick at the tip end.

In the present invention, the stem element is fabricated by means of a deep drawing process wherein a starting blank in the form of a sheet-like disk is subjected to a plurality of cold drawing steps which result in an elongated flared cup wherein the outer edge of the flared end and the tip end are substantially of the thickness of the starting blank. In accordance with one aspect of the invention, one or more keeper grooves is rolled into the hollow stem as an added step to the drawing process.

Heretofore, the deep drawing process used in accordance with the invention has not been considered to be practical for fabricating engine valves, and particularly exhaust valves, because materials having sufficient ductility to be deep drawn have not been considered to have sufficient hot strength properties for use in engine valves. The present invention, however, utilizes a drawn stem element in combination with cooling and strength enhancing features which make the use of high ductility materials practical for this application.

In accordance with other aspects of the invention, the cap element is optimally shaped to enhance the strength and rigidity of the valve, and the cap is welded to the stem in a region where there is an optimum stress/temperature relationship, and in accordance with alternative embodiments, the cap includes ribs which serve to increase the stiffness of the combustion face of the valve and to improve heat transfer between the combustion face and an internal coolant.

Other aspects and advantages of the invention will be apparent from the following description when considered in connection with the accompanying drawings, wherein:

FIGS. 2b and 2c are sectional views of alternative embodiments of the cap portion shown in FIG. 2a;

FIGS. 3a–3d are schematic sectional views of various steps in the fabrication of the stem portion of the valve shown in FIG. 1.

FIG. 4 is a fragmentary sectional view of showing a method for forming a keeper groove in the stem portion.

FIG. 5 is a sectional view taken along line 5—5 of FIG. 4.

FIG. 8 is a fragmentary sectional view of an alternative embodiment of the invention;

FIG. 9 is a sectional view taken along line 9—9 of FIG. 8;

Figure 1:
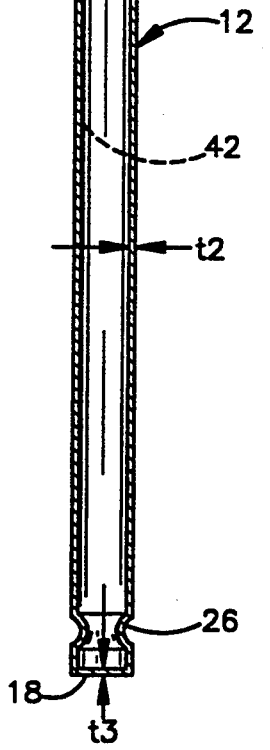
FIG. 1 is a cross sectional view of a valve in accordance with the present invention.

Referring to FIG. 1, there is illustrated a poppet valve 10 comprising a stem element 12 and a cap member 14 welded or otherwise joined to the stem element. In the preferred embodiment, the stem element for an intake valve can be fabricated using a ductile metal sheet product such as SAE 1008 steel, while the stem element for an exhaust valve can be fabricated using a stainless steel such as UNS305 or Incoloy 800, the cap being formed of a stainless steel or other compatible material in either case. It can be appreciated that the specific materials will vary depending on the engine application.

Figure 1A:
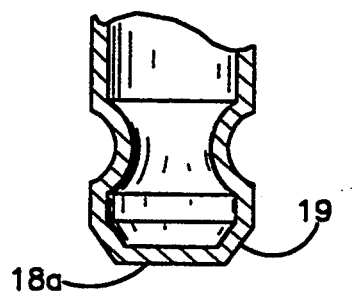
FIG. 1a is a partial cross sectional view showing an alternative design for the tip portion of the valve of FIG. 1.

As will be described in further detail below, the stem element 12 is formed by a deep drawing process which results in a first wall thickness $t_1$ in the fillet region 16 and which is a maximum at the outer extremity of the fillet region; is at a second thickness $t_2$ less than $t_1$ throughout the length of the stem, and which is at a third thickness $t_3$ at the tip 18 which is approximately the same as thickness $t_1$. FIG. 1a shows an alternative tip design wherein the tip 18a includes a bevel 19 to increase the stiffness of the tip end of the valve. In the example illustrated, the bevel is preferably formed at an angle of 40°±10°.

Figure 2A:
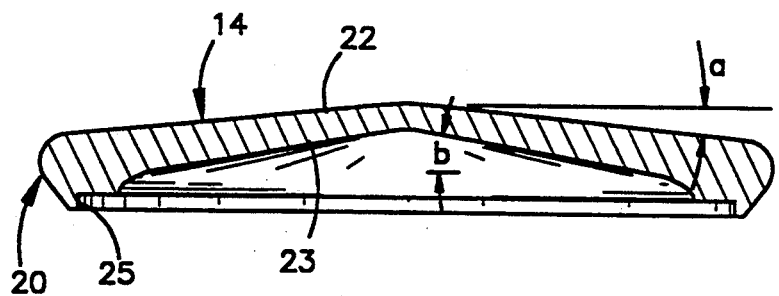
FIG. 2a is an enlarged sectional view of the cap portion of the valve shown in FIG. 1.
Figure 2B:
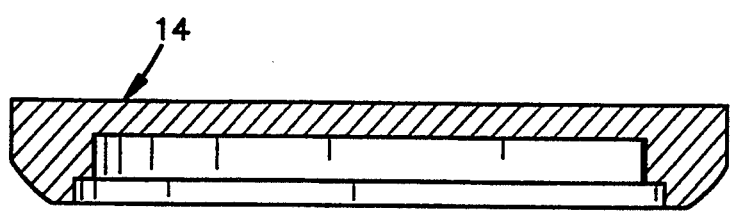
Figure 2C:
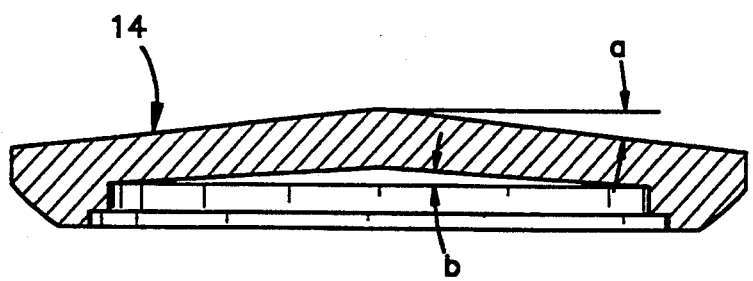

Referring particularly to FIG. 2a, the cap member 14 is a disk which is preferably formed with a convex combustion face 22 and a concave internal face 23. A seat face 20 can be formed by machining, deposition and machining or other known methods. In the preferred embodiment, the strength to weight ratio of the disk is maximized by tapering the wall from the outside in such that the angle b is greater than the angle a. In the preferred embodiment, the angle a is about 5° to a line perpendicular to the longitudinal axis of the stem, and the angle b is about 10° to such line. While the above represents a preferred embodiment, configurations wherein angle a is equal to angle b as shown in FIG. 2b and wherein angle a is greater than angle b as shown in FIG. 2c, can also be used.

In the preferred embodiment, the cap is welded to the stem element at 24, and a keeper groove 26 is rolled into the stem wall near the tip end of the valve. The weld 24, which can be done by a variety of known processes including laser, TIG, MIG, EB and resistance weld techniques, is located at the interface between the outer edge of the fillet 16 and a surface 25 formed on the cap adjacent the seat face, which, as will be described below, is an area of relatively lower temperature and thus higher material strength properties than adjacent areas. In applications wherein the valve is opened and closed directly by a fluid or electrical actuator, it may not be necessary to include a keeper groove.

In accordance with the invention, the stem element is formed by means of a cold forming process known as deep drawing, which is typically carried out on a so-called transfer press. In this process, a series of drawing steps is carried out on a workpiece which starts out as a flat sheet disk and which is stepwise transferred from one set of drawing tools to another with a plurality of the steps being carried out within a single transfer machine but wherein each of the steps is individually cam operated. The result of this process is the transformation of the flat disk into an elongated cup member formed to near net diameters and of exceptional straightness. The process is capable of producing parts which have exceptionally thin walls but of relatively high strength due to the inherent cold working of the material in the course of the drawing process.

Referring to FIGS. 3a–3d, there is schematically illustrated several typical steps in the transfer process starting with a sheet disk 12(a) in FIG. 3a and progressing through a number of intermediate steps, depending on the final length of the valve, as illustrated by FIGS. 3b and 3c; wherein the workpiece is held in fixtures 28b–28d, while cam-actuated plungers or mandrels 30b–30d are engaged with the workpiece to draw it to the desired shape. Additional steps to trim the open flared end, to true the radius of the fillet portion and to obtain the final diameter of the stem portion can also be made in the course of or after completion of the drawing process. A further pressing operation may also be carried out to insure that the tip of the valve is in its desired final shape (flat in the illustrative embodiments).

Referring to FIGS. 4 and 5, the present invention can also include a step wherein the keeper groove 26 is formed as a part of the cold forming process. In this step, the workpiece in its nearly completed form is transferred to a station within the transfer press wherein the workpiece is received between two dies 32 and 34 which are geared or otherwise linked together to move in opposite directions, as indicated by the arrows in FIG. 5, to roll the workpiece between them. To form the groove 26, the die 32 has a knurled or other high friction surface 33 formed thereon to grip the workpiece, and the die 34 has a projection 35 thereon in the form of a ramp to displace the material of the workpiece wall to form the keeper groove. Other methods of forming the groove can also be used, including a plurality of radially movable circular dies in surrounding relation to the workpiece. Because of the displacement of the material, the final steps to insure the shape of the tip end as well as to obtain the final dimensions of the stem portion are carried out after the groove rolling step. A single groove is shown herein; however, it can be appreciated that multiple grooves of varied shape can be formed if required for a particular engine design, or to provide additional stiffness.

The final stem element 12 which results from the above process is characterized by an integral tip end and by a very thin wall through the length of the straight portion of the stem but wherein the thickness $t_1$ and $t_3$ in the areas of the fillet and the tip respectively are essentially the thickness of the original metal sheet 12a in FIG. 3a.

The significance of the wall thickness relationships and the design of the cap 14 can be appreciated by reference to FIGS. 6 and 7, which provide comparative temperature, stress and strength profiles for similarly configured hollow exhaust valves 50% filled with sodium potassium coolant.

Figure 6A:
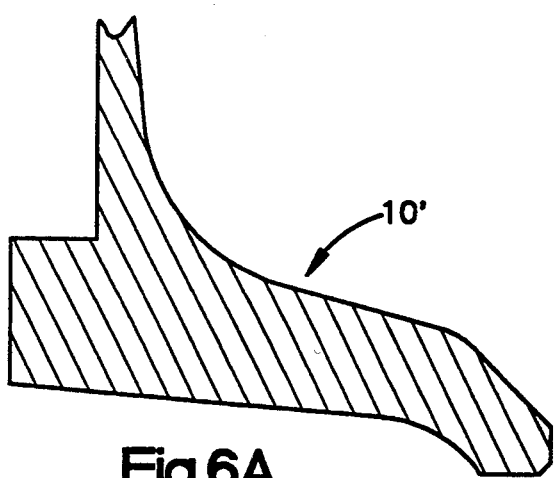
FIGS. 6a–6c illustrate typical stress and temperature distributions on the surface of a prior art exhaust valve.
Figure 6B:
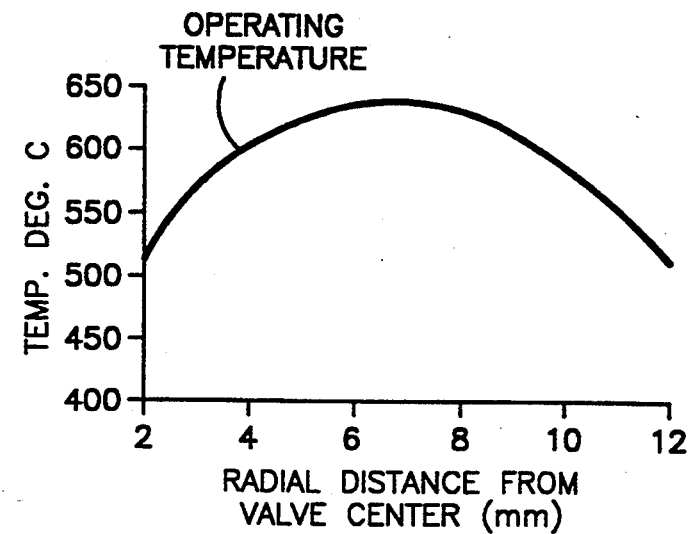
Figure 6C:
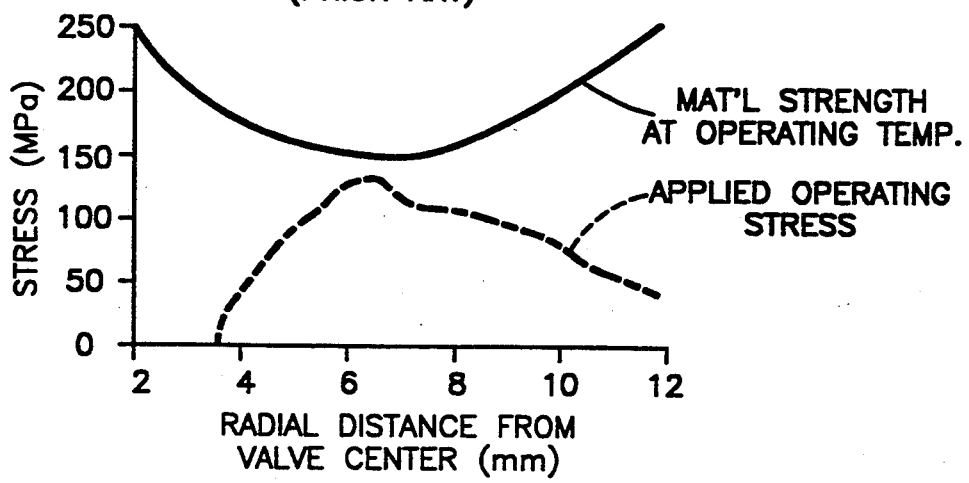
Figure 7A:
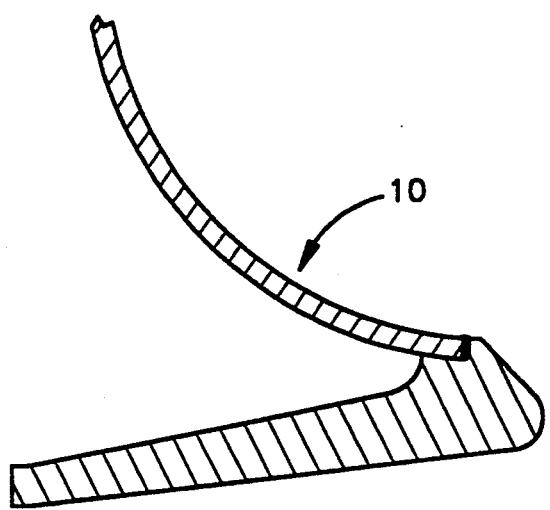
FIGS. 7a–7c illustrate typical stress and temperature distributions on the surface of an exhaust valve in accordance with the present invention.
Figure 7B:
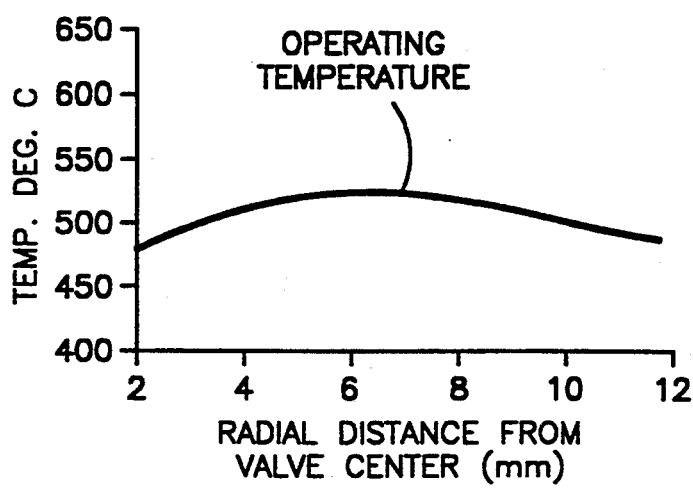
Figure 7C:
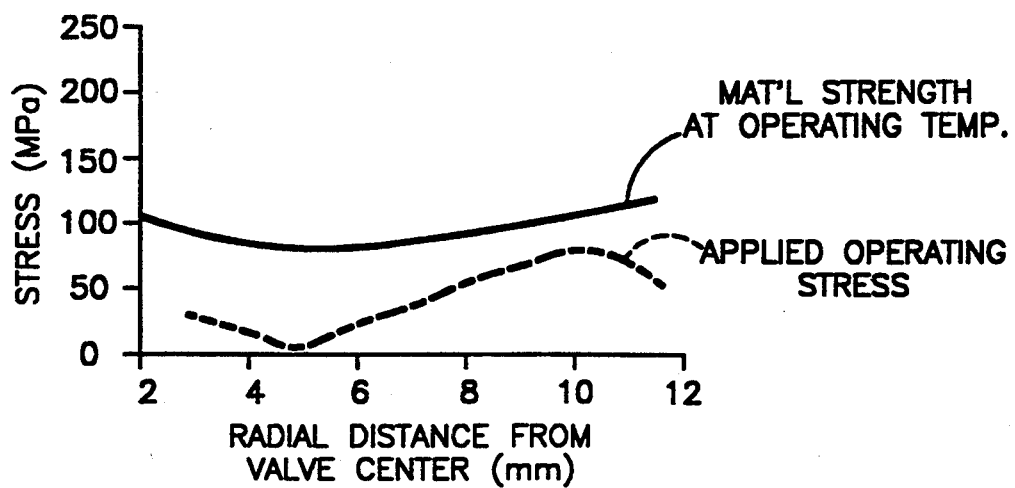

FIGS. 6a–6c depict a drilled prior art valve fabricated from a 400 series martensitic stainless steel or a 21-2n stainless steel, and include results derived from experimental data and/or finite element analysis. FIGS. 7a–7c depict a valve in accordance with the invention, and include results derived empirically and/or by finite element analysis.

Referring to FIGS. 6b and 6c, it can be observed that both the maximum stress and the maximum temperature occur in the fillet area about midway between the centerline and the seat face, and that the pronounced peak in the temperature curve at this point results in a corresponding trough in the material strength curve.

FIGS. 7b and 7c represent characteristics which can be expected to be obtained in the inventive valve, wherein the extremely thin wall construction results in improved heat transfer characteristics and an improved stress profile. It can be observed that while the maximum temperature occurs in the same area as in the prior art valve, the temperature curve is nearly flat. In the inventive valve, the extremely thin wall section of the stem portion combined with a cap design bridging the flared fillet portion of the stem tends to move the area of highest stress outward from the centerline of the valve toward the outer edge of the valve where the temperature is at a relatively low level. This separation of the area of maximum stress from the area of maximum temperature provides more flexibility in the choice of materials which can be used, since the material strength properties are greater at lower temperatures. The relative flatness of the strength curve also contributes to greater flexibility in the choice of materials. Another advantage of this construction is that the weld joint between the stem portion and the cap can also be located in a relatively low temperature area.

Referring again to FIG. 2a, the location and level of maximum stress is affected to a significant degree by the design of the cap 14, with the preferred embodiment illustrated therein providing an optimum combination of maximized strength and stiffness and minimized weight. Referring to FIGS. 8 and 9, there is illustrated an alternative embodiment of the invention wherein the cap 14b has a flat combustion face 22a and wherein a plurality of ribs 28 are formed on the inner face as shown in full line in FIG. 8 or on the combustion face 28' as shown in broken line. The ribs act as stiffeners for the cap and essentially serve the same function as the angled configuration of the FIG. 1 embodiment. The ribs further act to increase the surface area of the cap to improve heat transfer.

Figure 10:
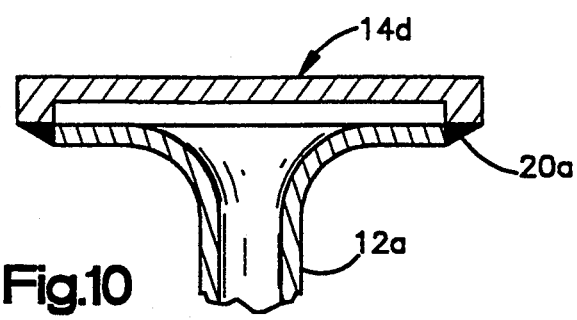
FIGS. 10–12 are fragmentary cross sectional views of further alternative embodiments of the invention.

Referring to FIG. 10, there is shown an alternative embodiment wherein the cap 14d is dimensioned to leave a gap in the area of the seat face. This gap is filled with a hard seat facing material such as Stellite or other known hardfacing material and then finished to the final seat face configuration to define a hardened seat face 20a as well as to attach the cap to the stem element 12a. Such construction is used in applications where an extremely hard seat face is required, such as in aircraft engines, and combines the attachment of the cap to the stem element and the formation of the hard seat face into a single operation.

Figures 11, 12:
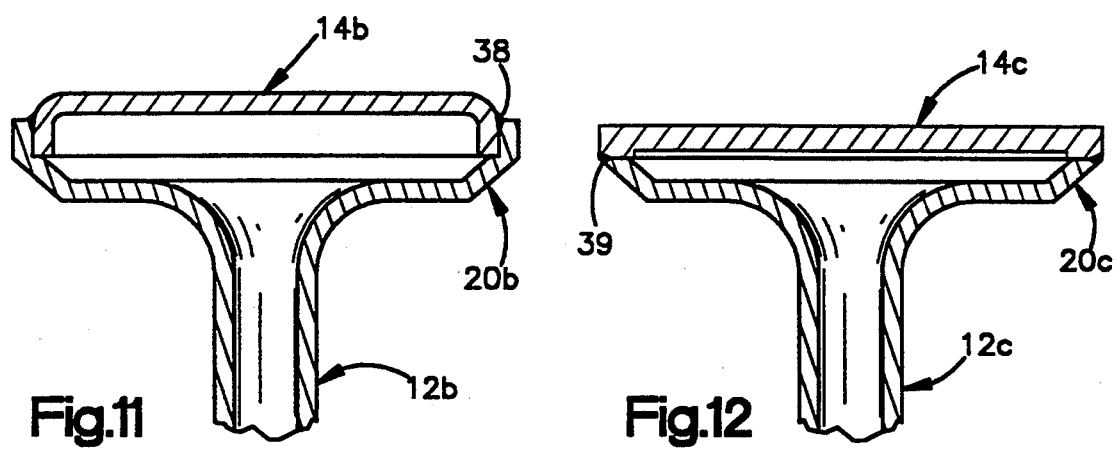

In the embodiment shown in FIG. 11, the stem element 12b is formed such that the seat face 20b is formed on the stem element, and the cap 14b fits inside the stem element and is welded thereto at 38. In the embodiment shown, the cap is formed with a flat combustion face; however, it can be understood that the cap can be formed in a variety of specific shapes including those described herein, and can also include the rib configurations described above.

FIG. 12 illustrates an embodiment wherein the seat face 20c is formed on the stem element and the cap 14c is butt welded to the stem element at 39. Again, the specific shape of the cap can be varied as described with respect to FIG. 11.

While the valve 10 of the invention can be used without the addition of a coolant, particularly as an intake valve, to take advantage of its extreme light weight, it is expected that for exhaust valve applications a coolant such as sodium potassium (NaK) or water will be added to a selected level designated 42 and shown in broken line in FIG. 1 prior to completing the welding of cap 14 to stem element 12 to enhance cooling. While the addition of such coolant is well known in the art, the extremely thin wall section of the present valve significantly increases the volume available for the coolant and increases the heat transfer area exposed to the coolant as illustrated by comparing FIGS. 13b and 13c. Also, since in coolant-filled valves the valve wall acts as a barrier to heat transfer from the internal coolant to the external cylinder head valve guide, the extremely thin wall section of the valve of the invention minimizes this barrier effect.

While adding an internal coolant to an exhaust valve is well known, the addition of such coolant to an intake valve has demonstrated a significant decrease in deposits along the fillet region in certain applications. The increased cooling effect of a valve in accordance with the present invention can be expected to further decrease such deposits.

Figures 13A, 13B, 13C:
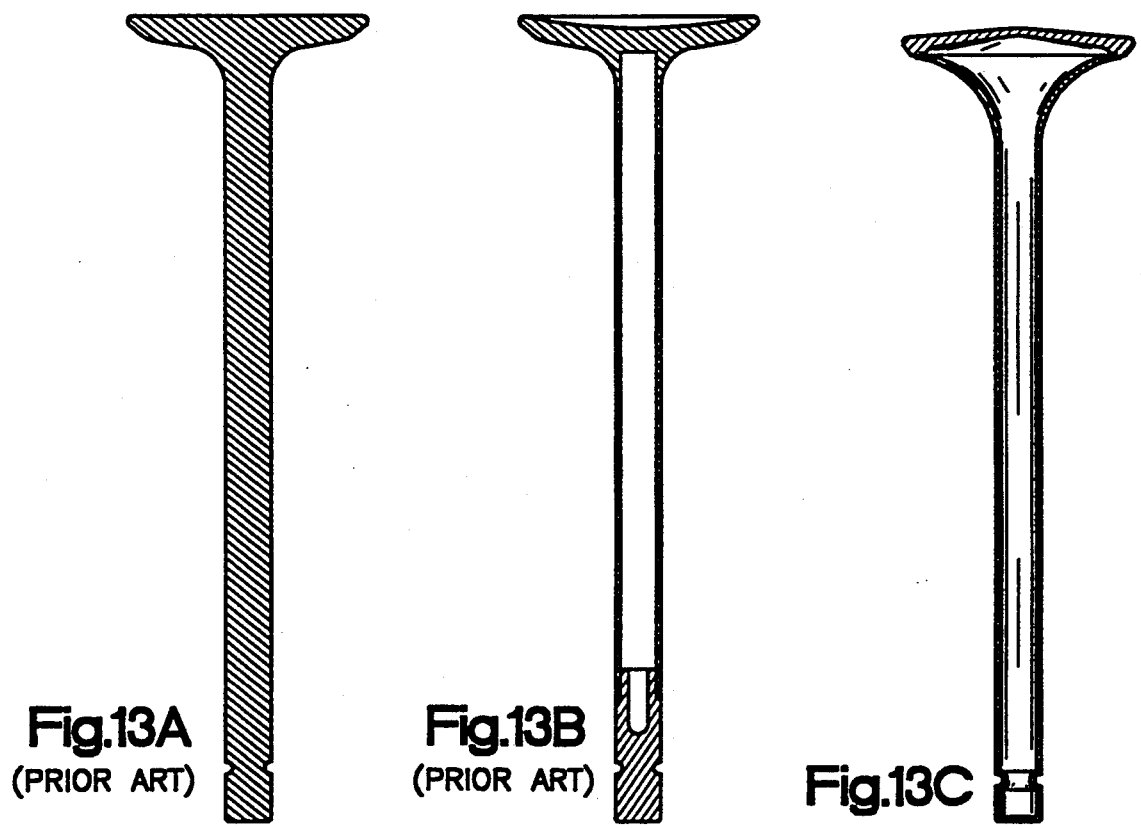
FIG. 13a is a sectional view of a prior art solid valve.
FIG. 13b is a sectional view of a prior art hollow valve.
FIG. 13c is a sectional view of a valve of the invention shown in substantially the same scale as FIGS. 13a and 13b.

FIGS. 13a, 13b and 13c show engine valves of the same stem and head diameter and the same length but using three different structures. FIG. 13a shows a prior art solid valve, FIG. 13b shows a prior art valve having a drilled stem, and FIG. 13c shows a valve in accordance with the present invention. Table 1 below compares specifications for a typical passenger car engine valve using calculated values for displaced volume (i.e. total volume of the exterior valve envelope) and weight and the use of similar materials.

TABLE 1

|  | Head Dia. | Stem Dia. | Length | Displ. Vol. | Min. Wall Thick. | Empty Wt. | Total Wt. 50% NaK |
|---|---|---|---|---|---|---|---|
| FIG. 13a | 28 mm | 6 mm | 100 mm | 5.2 cc | N.A. | 41 g | N.A. |
| FIG. 13b | 28 mm | 6 mm | 100 mm | 5.2 cc | 0.75 mm | 32 g | 33 g |
| FIG. 13c | 28 mm | 6 mm | 100 mm | 5.2 cc | 0.50 mm | 17 g | 19 g |

Referring to the table, it can be seen that the valve in accordance with the invention is 59% lighter than a solid valve of the same dimensions and 47% lighter than the drilled valve in the empty state. It can also be seen that even when a coolant, specifically a 50% fill of NaK, is added to the valve in accordance with the present invention, there is still a significant weight advantage.

The valve of FIG. 13c illustrates a typical valve made in accordance with the invention, and the minimum wall thickness of 0.50 mm is intended to show a minimum for the illustrative valve only, not an absolute minimum. Even thinner wall sections can be achieved if a coolant which vaporizes at the valve operating temperature is added since the increased internal pressure which results when the coolant is vaporized will add stiffness to the valve structure, much in the way that an aluminum can is stiffened when filled with a carbonated beverage.

Table 2 compares internal and external stem diameters and the total or displaced volume and cavity volume for a series of actual prior art intake and exhaust valve designs of the configuration of FIG. 13b and for actual designs of the inventive configuration as shown in FIG. 13c.

TABLE 2

| Design FIG. | Type | Cavity Dia. (mm) | Stem Dia. (mm) | Dia. Ratio | Displ. Vol. (cc) | Cavity Vol. (cc) | Vol. Ratio |
|---|---|---|---|---|---|---|---|
| 13b (1) | Ex. | 6.35 | 10.2 | 1.606 | 17.72 | 2.88 | 6.153 |
| 13b (2) | Ex. | 6.35 | 9.4 | 1.480 | 16.28 | 2.88 | 5.653 |

TABLE 2-continued

| Design FIG. | Type | Cavity Dia. (mm) | Stem Dia. (mm) | Dia. Ratio | Displ. Vol. (cc) | Cavity Vol. (cc) | Vol. Ratio |
| --- | --- | --- | --- | --- | --- | --- | --- |
| 13b (3) | In. | 7.00 | 8.5 | 1.214 | 14.59 | 3.99 | 3.657 |
| 13b (4) | In. | 5.50 | 7.0 | 1.273 | 11.20 | 2.32 | 4.828 |
| 13b (5) | Ex. | 7.00 | 8.5 | 1.214 | 11.62 | 3.19 | 3.643 |
| 13b (6) | In. | 7.20 | 8.7 | 1.208 | 13.62 | 4.04 | 3.371 |
| 13b (7) | Ex. | 7.20 | 8.7 | 1.208 | 11.78 | 3.61 | 3.263 |
| 13b (8) | In. | 5.50 | 7.0 | 1.272 | 7.15 | 2.10 | 3.405 |
| 13b (9) | In. | 5.50 | 7.0 | 1.273 | 5.51 | 1.21 | 4.554 |
| 13b (10) | Ex. | 4.50 | 6.0 | 1.333 | 6.07 | 1.85 | 3.281 |
| 13b (11) | Ex. | 4.50 | 6.0 | 1.333 | 4.76 | 1.05 | 4.533 |
| 13b (12) | In. | 4.50 | 6.0 | 1.333 | 5.05 | 1.26 | 4.088 |
| 13b (13) | Ex. | 4.50 | 6.0 | 1.333 | 4.37 | 1.20 | 3.642 |
| 13c (1) | Ex. | 5.00 | 6.0 | 1.200 | 5.12 | 2.33 | 1.809 |
| 13c (2) | In. | 5.00 | 6.0 | 1.200 | 6.13 | 3.46 | 1.772 |

We claim:

1. An ultra light poppet valve for an internal combustion engine comprising a stem portion, a cap portion, a tip portion and a flared fillet portion defining a transition region between said stem portion and said cap portion; said stem portion, said tip portion and said fillet portion being defined by a one-piece, thin-walled cylindrical member which is open at the fillet end thereof and closed at the tip end; and said cap portion being defined by a disk-like cap member fixed to said fillet portion characterized by said fillet portion having a first maximum wall thickness, said stem portion having a second maximum wall thickness thinner than said first maximum wall thickness, and said tip portion having a third wall thickness thicker than said second maximum wall thickness.

2. A valve as claimed in claim 1 in which said third wall thickness is substantially uniform and said first maximum wall thickness and said third wall thickness are substantially equal.

3. A valve as claimed in claim 2 including a beveled surface formed at the intersection of said stem portion and said tip portion.

4. A valve as claimed in claim 3 in which said beveled surface is formed at an angle of 40°±10°.

5. A valve as claimed in claim 1 in which the top surface of said cap member defines a combustion face exposed to combustion pressures generated by said engine; said surface being a surface of revolution formed at a first angle to a line perpendicular to the longitudinal axis of said stem portion and the surface opposite said combustion surface being formed at a second angle to said line perpendicular to the longitudinal axis of said stem portion.

6. A valve as claimed in claim 5 in which said first angle is zero degrees and said second angle is zero degrees.

7. A valve as claimed in claim 5 in which said first and second angles are each greater than zero degrees and are equal.

8. A valve as claimed in claim 5 in which said first angle is greater than said second angle.

9. A valve as claimed in claim 5 in which said first angle is less than said second angle.

10. A valve as claimed in any one of claims 5 through 9 in which said cap member has one or more radially disposed ribs formed thereon.

11. A valve as claimed in claim 1 wherein said valve includes a valve seat engaging face formed on said cap member.

12. A valve as claimed in claim 1 wherein said valve includes a valve seat engaging face formed on said fillet portion.

13. A valve as claimed in claim 1 including a vaporizable liquid coolant contained within said valve.

14. An ultra light poppet valve for an internal combustion engine comprising a stem portion, a cap portion, a tip portion and a flared fillet portion defining a transition region between said stem portion and said cap portion; said stem portion being hollow and having a wall section which is sufficiently thin to cause the point of maximum stress in said valve due to combustion pressures generated by said engine to be located at a point at least 70% of the radial distance from said centerline to the outer edge of the valve.

15. A valve as claimed in claim 14 in which said stem portion, said tip portion and said fillet portion are defined by a one-piece cylindrical member which is open at the fillet end thereof and closed at the tip end; and said cap portion is defined by a disk-like cap member fixed to said fillet portion.

16. An ultra light poppet valve for an internal combustion engine comprising a stem portion, a cap portion, a tip portion and a flared fillet portion defining a transition region between said stem portion and said cap portion; said cap portion being defined by a disk-like cap member fixed to said fillet portion and said stem portion, said tip portion and said fillet portion being defined by a one-piece, thin-walled cylindrical member which is open at the fillet end thereof and closed at the tip end; the thin wall of the stem portion extending the full length of said stem portion to the intersection of the stem portion with the tip portion.

17. An ultra light poppet valve for an internal combustion engine comprising a stem portion, a cap portion, a tip portion and a flared fillet portion defining a transition region between said stem portion and said cap portion; said stem portion, said tip portion and said fillet portion being defined by a one-piece, thin-walled cylindrical member which is open at the fillet end thereof and closed at the tip end; and said cap portion being defined by a disk-like cap member fixed to said fillet portion and having a top surface defining a combustion face exposed to combustion pressures generated by said engine, said top surface being a surface of revolution formed at a first angle to a line perpendicular to the longitudinal axis of said stem portion which is greater than zero and having a surface opposite said combustion face which is formed at a second angle to said line perpendicular to the longitudinal axis of said stem portion which is not equal to said first angle.

18. A valve as claimed in any one of claims 1, 2, 3, 4, 14, 26 or 17 including one or more grooves formed in the stem portion thereof.

* * * * *